US008412232B2

(12) United States Patent
Gupta et al.

(10) Patent No.: US 8,412,232 B2
(45) Date of Patent: Apr. 2, 2013

(54) METHODS AND APPARATUSES FOR USE IN ESTIMATING A LOCATION OF A MOBILE DEVICE WITHIN A STRUCTURE

(75) Inventors: Rajarshi Gupta, Sunnyvale, CA (US); Saumitra Mohan Das, San Jose, CA (US); Min-Wook Jeong, Stanford, CA (US)

(73) Assignee: QUALCOMM Incorporated, San Diego, CA (US)

( * ) Notice: Subject to any disclaimer, the term of this patent is extended or adjusted under 35 U.S.C. 154(b) by 63 days.

(21) Appl. No.: 13/212,480

(22) Filed: Aug. 18, 2011

(65) Prior Publication Data

US 2012/0046045 A1   Feb. 23, 2012

Related U.S. Application Data

(60) Provisional application No. 61/375,692, filed on Aug. 20, 2010.

(51) Int. Cl.
*H04W 24/00* (2009.01)
*H04M 11/04* (2006.01)
*G01S 3/02* (2006.01)

(52) U.S. Cl. ............... 455/456.1; 455/456.6; 455/404.2; 455/457; 342/450; 342/451

(58) Field of Classification Search ............... 455/404.2, 455/456.1–457; 340/988–996; 342/450–465
See application file for complete search history.

(56) References Cited

U.S. PATENT DOCUMENTS

| | | | |
|---|---|---|---|
| 6,664,925 | B1 | 12/2003 | Moore et al. |
| 7,734,760 | B2 | 6/2010 | Cen et al. |
| 2003/0043073 | A1 | 3/2003 | Gray et al. |
| 2004/0152470 | A1* | 8/2004 | Spain ......................... 455/456.1 |
| 2007/0126634 | A1* | 6/2007 | Bye ................................ 342/451 |
| 2008/0220720 | A1 | 9/2008 | Ashley et al. |
| 2009/0067392 | A1* | 3/2009 | Hart et al. ...................... 370/338 |
| 2009/0156230 | A1* | 6/2009 | Versteeg ................... 455/456.1 |
| 2010/0026513 | A1 | 2/2010 | Pandey |

FOREIGN PATENT DOCUMENTS

EP   2116863 A1   11/2009

OTHER PUBLICATIONS

Teemu et al., "A Probabilistic Approach to WLAN User Location Estimation", International Journal of Wireless Information Networks, vol. 9, No. 3, Jul. 2002.*
Chai et al., "Reducing the Calibration Effort for Probabilistic Indoor Location Estimation", IEEE Transactions on Mobile Computing, Jun. 1, 2007, pp. 649-662, vol. 6, No. 6, IEEE Service Center, XP011179709, ISSN: 1536-1233, DOI: 10.1109/TMC.2007.1025.
International Search Report and Written Opinion—PCT/US2011/048353—ISA/EPO—Dec. 14, 2011.
Youssef M. A. et al., "WLAN location determination via clustering and probability distributions", Proceedings of the IEEE International Conference Pervasive Computing and Communications, Mar. 23, 2003, pp. 143-150, XP002314729.

* cited by examiner

*Primary Examiner* — Jean Gelin
*Assistant Examiner* — Dung Hong
(74) *Attorney, Agent, or Firm* — Berkeley Law & Technology Group, LLP

(57) ABSTRACT

Methods and apparatuses are provided that may be implemented in a mobile device to determine two or more variations between a baseline probability distribution and two or more probability distributions for signals received from two or more sets of transmitters assigned to two or more regions of a structure. The methods and apparatuses may be further implemented to determine whether the mobile device is located in at least one of the two or more regions based, at least in part, on a comparison of the two or more determined variations.

36 Claims, 5 Drawing Sheets

METHODS AND APPARATUSES FOR USE IN ESTIMATING A LOCATION OF A MOBILE DEVICE WITHIN A STRUCTURE

This patent application claims benefit of and priority to U.S. Provisional Patent Application 61/375,692, filed Aug. 20, 2010, Titled, "FLOOR DETERMINATION FOR INDOOR POSITIONING AND NAVIGATION", and which is hereby incorporated by reference.

BACKGROUND

1. Field

The subject matter disclosed herein relates to electronic devices, and more particularly to methods and apparatuses for use in a mobile device for estimating a location of the mobile device within at least one of a plurality of different regions of a structure.

2. Information

The Global Positioning System (GPS) represents one type of Global Navigation Satellite System (GNSS), which along with other types of satellite positioning systems (SPS) provide or otherwise support signal-based position location capabilities (e.g., navigation functions) in mobile devices, and particularly in outdoor environments. However, since some satellite signals may not be reliably received and/or acquired by a mobile device within an indoor environment or other like mixed indoor/outdoor environments, different techniques may be employed to enable position location services.

For example, mobile devices may attempt to obtain a position fix by measuring ranges to three or more terrestrial transmitters (e.g., wireless access points, beacons, cell towers, etc.) which are positioned at known locations. Such ranges may be measured, for example, by obtaining a MAC ID address from signals received from such transmitters and obtaining range measurements to the transmitters by measuring one or more characteristics of signals received from such transmitters such as, for example, signal strength, a round trip delay time, etc.

These and other like position location and navigation techniques tend to be of further benefit to a user if presented with certain mapped features. For example, mapped features may relate to or otherwise identify certain physical objects, characteristics, or points of interest within a building or complex, etc. Thus, in certain instances, an indoor navigation system may provide a digital electronic map to mobile device upon entering a particular indoor area, e.g., in response to a request for navigation assistance data. Such a map may show indoor features such as doors, hallways, entry ways, walls, etc., points of interest such as bathrooms, pay phones, room names, stores, etc. Such a digital electronic map may be stored at a server to be accessible by a mobile device through selection of a URL, for example. By obtaining and displaying such a map, a mobile device may overlay a current location of the mobile device (and user) over the displayed map to provide the user with additional context.

Accordingly, with the plethora of information that may be provided to and/or otherwise used by a mobile device, there is a continuing desire to reduce the amount of data and/or the size of data files that may need to be transmitted, stored, and/or processed by the various devices and communications resources.

SUMMARY

Various example methods, apparatuses and articles of manufacture are provided that may be implemented in, or for in or with, a mobile device to determine two or more variations between a baseline probability distribution and two or more probability distributions for signals received from two or more sets of transmitters assigned to two or more regions of a structure. The mobile device may, for example, determine whether it is located in at least one of the two or more regions based, at least in part, on a comparison of the two or more determined variations.

In accordance with certain example implementations, a method may be implemented at a mobile device to determine a first variation between one or more electrical signals representing a baseline probability distribution and one or more electrical signals representing a first probability distribution for signals received from a first set of transmitters assigned to a first region of a structure; determine a second variation between the one or more electrical signals representing the baseline probability distribution and one or more electrical signals representing a second probability distribution for signals received from a second set of transmitters assigned to a second region of the structure; determine whether the mobile device is located in the first region or the second region based, at least in part, on a comparison of the first variation and the second variation; and generate one or more electrical signals indicating a determined location of the mobile device with respect to the structure.

In other example implementations, an apparatus may be provided for use in a mobile device, which apparatus comprises means for determining: a first variation between a baseline probability distribution and a first probability distribution for signals received from a first set of transmitters assigned to a first region of a structure, and a second variation between the baseline probability distribution and a second probability distribution for signals received from a second set of transmitters assigned to a second region of the structure. Such an apparatus may further comprise means for determining whether the mobile device is located in the first region or the second region based, at least in part, on the first variation and the second variation.

In still other example implementations, a mobile device may be provided which comprises: a network interface; and a processing unit to: determine a first variation between a baseline probability distribution and a first probability distribution for signals received via the network interface from a first set of transmitters assigned to a first region of a structure; determine a second variation between the baseline probability distribution and a second probability distribution for signals received via the network interface from a second set of transmitters assigned to a second region of the structure; and determine whether the mobile device is located in the first region or the second region based, at least in part, on a comparison of the first variation and the second variation.

In yet other example implementations, an article of manufacture may be provided which comprises a non-transitory computer readable medium having stored therein instructions executable by a processing unit in a mobile device to: determine a first variation between a baseline probability distribution and a first probability distribution for signals received from a first set of transmitters assigned to a first region of a structure; determine a second variation between the baseline probability distribution and a second probability distribution for signals received from a second set of transmitters assigned to a second region of the structure; and determine whether the mobile device is located in the first region or the second region based, at least in part, on a comparison of the first variation and the second variation.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
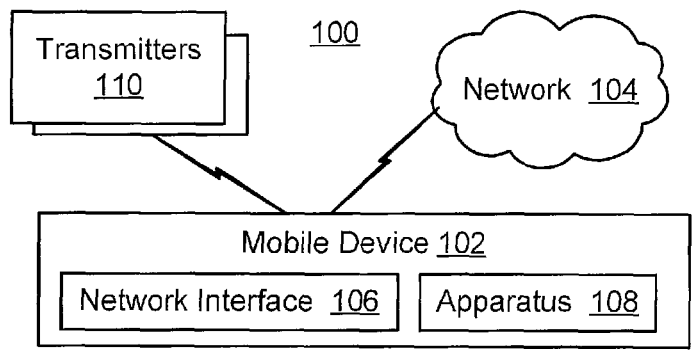
FIG. 1 is a schematic block diagram illustrating an example environment that includes a mobile device comprising an apparatus for use in estimating a location of the mobile device within at least one of a plurality of different regions of a structure, in accordance with an implementation.

According to certain example implementations, a mobile device may to estimate its current location within at least one of a plurality of different regions of a structure based, at least in part, on measured signal parameters from different sets of transmitters having known or identifiable assignments to the regions of a structure.

In an example implementation, individual transmitters may be arranged within or otherwise operated to primarily serve one or more regions of a structure. As used herein, such arrangements/operations may be referred to as "assignments", such that a transmitter may be considered to be assigned to one or more regions. In most instances, however, it may be the case that a transmitter will be assigned to just one region. Regardless as to how many regions a transmitter may be assigned to, for a given region there may be a set of transmitters assigned to that region, wherein the set of transmitters may comprise one or more transmitters. Hence, at times, a mobile device that is physically located within a particular region of a structure may receive signals transmitted from sets of transmitters assigned to that particular region and also possibly other sets of transmitters assigned to other (e.g., nearby) regions of the structure.

In accordance with certain example implementations, a mobile device may determine certain signal parameters (e.g., measured signal strengths, measured propagation times, etc., and/or some combination thereof) for signals received from different sets of transmitters, and based, at least in part thereon, determine a probability distribution for signals received from two or more different sets of transmitters. A mobile device may then, for example, determine a specific variation between a baseline probability distribution and the determined probability distributions for signals received from the two or more different sets of transmitters. A mobile device may then compare the resulting variations to identify a lowest relative variation, which will of course be associated with a particular set of transmitters assigned to a particular region of the structure, and, as such, estimate that its current location is within that particular region of the structure.

As described in greater detail herein, in certain example implementations, at least a part of at least one of a baseline probability distribution, or a determined probability distribution for a set of transmitters may mathematically correspond to and/or be otherwise be derived from a probability distribution function (PDF), a cumulative distribution function (CDF), a histogram, a continuous probability distribution, a discrete probability distribution, and/or the like or any combination thereof. In certain example implementations, a mobile device may further verify that at least one of a plurality of resulting variations satisfies a threshold variation.

In certain example implementations, a determined probability distribution may be based, at least in part, on signal strengths for signals received from a set of transmitters. For example, signal strengths may be based, at least in part, on a received signal strength indicator (RSSI) measured at the mobile device. In certain instances, a mobile device may, for example, selectively adjust one or more measured signal strength values, RSSI, etc., e.g., to normalize values or for other reasons.

In certain example implementations, a determined probability distribution may be based, at least in part, on a measured propagation times for signals received from a set of transmitters. For example, a measured propagation time may be based, at least in part, on a time of flight (TOF), a round trip time (RTT), etc., measured at or otherwise obtained by a mobile device. In certain instances, a mobile device may, for example, selectively adjust one or more measured propagation time values, TOF, RTT, etc., e.g., to normalize values or for other reasons.

In certain example implementations, one or more baseline probability distributions may be used. In certain instances, for example, a baseline probability distribution may be represented by one or more sets of data, one or more functions, or the like or combination thereof. In certain instances, for example, one or more baseline probability distributions may be associated, at least in part, with one or more structures, one or more specific classes of structures, one or more specific sets of transmitters, one or more specific classes of transmitters; one or more mobile devices, one or more specific classes of mobile devices, one or more specific periods of time, and/or the like or any combination thereof.

As used herein the term "structure" may, for example, apply to (all or part of) one or more natural and/or man-made physical arrangements of object(s), the knowledge of which may be of use to a user of a mobile device. For example, a structure may comprise all or part of a building that a user of a mobile device may enter into, exit from, and/or otherwise move about within. Some example structures may comprise a mixture of indoor and outdoor spaces. As applied in the example implementations, it is assumed that a structure comprises two or more different regions.

As used herein the term "region" may, for example, relate to a part of a structure that may be distinguished from another part of the structure. In certain instances, for example, two or more different regions may be distinguished from one another based, at least in part, on various physical arrangements of objects, e.g., floors, ceilings, decks, walls, staircases, elevators, walkways, etc. Thus, for example, two or more regions of a structure may relate to two or more different levels (e.g., floors) of a building, two or more office suites in a building, etc. As such, in certain instances, some physically distinguishable regions may also be mutually exclusive such that a mobile device may only be located within one such region at any given time.

In certain further or other instances, for example, two or more different regions may be distinguished from one another based, at least in part, on specific operative assignments (e.g., intended primary uses, etc.) of different sets of transmitters. Thus, for example, two or more regions of a structure may relate to two or more different sets of transmitters as operatively provided by two or more different businesses and/or other like organizations which may reside in a structure. As such, in certain instances, some operatively distinguishable regions may not be mutually exclusive because a mobile device may at times be located within two or more overlapping operative regions.

As illustrated by the examples herein, methods and apparatuses may be implemented which may allow a mobile device to estimate its location within a region (e.g., a physically distinguishable region, and/or an operatively distinguishable region) of a structure.

FIG. 1 is a schematic block diagram illustrating an example environment 100 that includes a mobile device 102 comprising an apparatus 108 for use in estimating a location of mobile device 102 within at least one of a plurality of different regions of a structure, in accordance with an implementation.

By way of example, mobile device 102 may comprise any electronic device that may be moved about by a user within a structure and which comprises a network interface 106 for receiving signals transmitted by transmitters 110. Thus, by way of some examples, mobile device 102 may comprise a cell phone, a smart phone, a computer (e.g., a personal computer such as a laptop computer, a tablet computer, a wearable computer, etc.), a navigation aid, a digital book reader, a gaming device, a music and/or video player device, a camera, etc.

Apparatus 108 is representative of circuitry, such as, e.g., hardware, firmware, a combination of hardware and software, and/or a combination of firmware and software or other like logic that may be provided in mobile device 102 for use in estimating a location of mobile device 102 within at least one of a plurality of different regions of a structure.

In certain example implementations, mobile device 102 may function exclusively or selectively as a stand-alone device, and may provide a one or more capabilities/services of interest/use to a user. In certain example implementations, mobile device 102 may communicate in some manner with one or more other devices, for example, as illustrated by the wireless communication link to the cloud labeled network 104. Network 104 may be representative of one or more communication and/or computing resources (e.g., devices and/or services) which mobile device 102 may communicate with, e.g., via network interface 106 using one or more wired or wireless communication links. Thus, in certain instances mobile device 102 may receive (or send) data and/or instructions via network 104. In certain instances, mobile device 102 may, for example, not only received a signal from a transmitter 110, but may also transmit a signal to such transmitter.

In certain example implementations, mobile device 102 may be enabled to receive signals associated with one or more wireless communication networks, location services, and/or the like or any combination thereof which may be associated with one or more transmitters 110 and/or network 104.

Mobile device 102 may, for example, be enabled (e.g., via network interface 106) for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., "4G"), such as, for example, Long Term Evolution (LTE), Advanced LTE, WiMAX, Ultra Mobile Broadband (UMB), and/or the like.

In certain example implementations, mobile device 102 may be enabled (e.g., via network interface 106 or other location receiver) for use with various location service(s), such as, a Global Navigation Satellite System (GNSS), or other like satellite and/or terrestrial locating service, a location based service (e.g., via a cellular network, a WiFi network, etc.).

Figure 2:
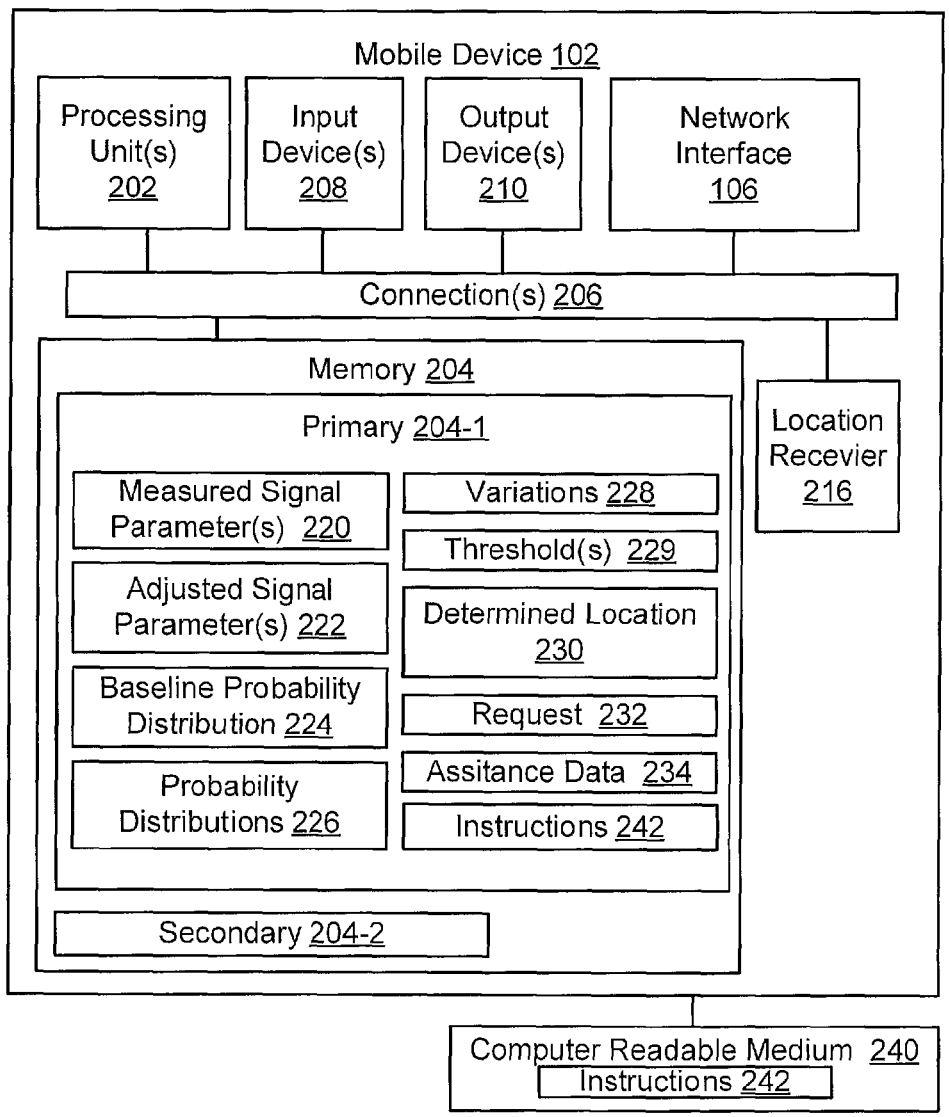
FIG. 2 is a schematic block diagram illustrating certain features of an example mobile device comprising an apparatus to estimate its location within at least one of a plurality of different regions of a structure, in accordance with an implementation.

Reference is made next to FIG. 2, which is a schematic block diagram illustrating certain features of mobile device 102, for example as in FIG. 1, in accordance with an implementation.

As illustrated mobile device 102 may comprise one or more processing units 202 to perform data processing (e.g., in accordance with the techniques provided herein) coupled to memory 204 via one or more connections 206. Processing unit(s) 202 may, for example, be implemented in hardware or a combination of hardware and software. Processing unit(s) 202 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, or the like, or any combination thereof.

Memory 204 may be representative of any data storage mechanism. Memory 204 may include, for example, a primary memory 204-1 and/or a secondary memory 204-2. Primary memory 204-1 may comprise, for example, a random access memory, read only memory, etc. While illustrated in this example as being separate from the processing units, it should be understood that all or part of a primary memory may be provided within or otherwise co-located/coupled with processing unit(s) 202, or other like circuitry within mobile device 102. Secondary memory 204-2 may comprise, for example, the same or similar type of memory as primary memory and/or one or more data storage devices or systems, such as, for example, a disk drive, an optical disc drive, a tape drive, a solid state memory drive, etc. In certain implementations, secondary memory may be operatively receptive of, or otherwise configurable to couple to, computer readable medium 240. Memory 204 and/or computer readable medium 240 may comprise instructions 242 associated with data processing (e.g., in accordance with the techniques and/or apparatus 108 (FIG. 1), as provided herein).

Mobile device 102 may, for example, further comprise one or more user input devices 208, one or more output devices 210, one or more network interfaces 106, and/or one or more location receivers 216.

Input device(s) 208 may, for example, comprise various buttons, switches, a touch pad, a trackball, a joystick, a touch screen, a microphone, a camera, and/or the like, which may be used to receive one or more user inputs. Output devices 210 may, for example, comprise various devices that may be used in producing a visual output, an audible output, and/or a tactile output for a user.

A network interface 106 may, for example, provide connectivity to one or more transmitters 110 and/or networks 104 (FIG. 1), e.g., via one or more wired and/or wireless communication links. Location receiver 316 may, for example, obtain signals from one or more location services, which may be used in estimating a location that may be provided to or otherwise associated with one or more signals stored in memory. For example, a location receiver may be used to estimate that mobile device 102 is at or nearby, or possibly approaching a particular structure.

Processing unit(s) 202 and/or instructions 242 may, for example, provide or otherwise be associated with one or more signals stored in memory 204, such as, one or more measured signal parameters 220, one or more adjusted signal parameters 222, one or more baseline probability distributions 224, one or more determined probability distributions 226, one or more determined variations 228, one or more threshold values 229, a determined location 230, a request 232 for assistance data, assistance data 234, and/or the like or any combination thereof, e.g., as described in the various example techniques herein.

As known, Global Positioning System (GPS) and other like GNSS have enabled navigation services for mobile devices in outdoor environments. Since satellite signals may not be reliably received and/or acquired in an indoor environment, different techniques may be employed to enable navigation services. For example, mobile devices may obtain a position fix by measuring ranges to three or more terrestrial wireless access points which are positioned at known locations. Such ranges may be measured, for example, by obtaining a MAC ID address from signals received from such access points and obtaining range measurements to the access points by measuring one or more characteristics of signals (e.g., in the form of signal parameters) received from such access points such as, for example, signal strength, round trip delay.

In certain instances, an indoor navigation system may provide assistance data 234 to mobile device 102 via network interface 106. For example, assistance data may be provided to mobile device 102 in response to a request 232, and/or possibly sans a request as mobile device 102 is determined to have entered or to be entering into a particular structure, set of structures, and/or one or more regions associated with a structure or set of structures. For example, assistance data 234 may identify various transmitting, processing, and/or other like resources (e.g., devices, services, etc.) that may be associated with a structure or region therein. For example, assistance data 234 may comprise navigation information, e.g., such as a digital electronic map, and/or the like, which may identify various communication/computing resources and/or other features or other objects such as doors, hallways, entry ways, walls, etc., points of interest such as bathrooms, pay phones, room names, stores, etc. In certain instances, navigation based assistance data may, for example, comprise information that may be used to facilitate measurements of ranges to transmitters 110 having known locations. For example, "heatmap" data indicating expected RSSI and/or round-trip delay times associated with various transmitters 110 (e.g., access point devices) may enable mobile device 102 to associate observed signal characteristics with specific locations within a region of a structure. In certain instances, navigation based assistance data may, for example, comprise information identifying locations of other types of transmitters 110, such as, e.g., radio frequency (RF) beacon transmitters for use obtaining position estimates through trilateration (e.g., by computing ranges to RF beacon transmitters from RSSI and round-trip delay). In certain instances, navigation based assistance data may, for example, comprise routeability information indicative of feasible/navigable paths within a region. In yet another example implementation, navigation based assistance data may comprise probability heatmap data for use in tracking a trajectory of mobile device 102, e.g., using various particle filtering techniques and/or the like.

Assistance data 234 may, for example, be stored at a server or other like computing resource of network 104 (see, FIG. 1) that may be accessed by or otherwise provided to mobile device 102. Assistance data 234 may then, for example, be stored and/or cached in memory 204 the mobile device for use in executing one or more navigation related applications, and/or the like.

For certain structures and possibly even for some regions in a structure, there may be a significant amount of navigation information available to be provided to mobile device 102. For example, there may be a significant amount of assistance data covering all or even some of the regions within a large building or region therein. Hence, it may be impracticable (costly, time consuming, etc.) to send all of the available assistance data for a structure or certain regions therein to mobile device 102, e.g., in response to the device entering such a structure.

However, as pointed out in the examples herein, it may be practical for mobile device 102 to specifically request all or part of the available assistance data via one or more requests which specify that such assistance data relate to a particular region that the mobile device is estimated to be located within, e.g., as identified by determined location 230.

By way of example, in certain instances detailed navigation assistance data may be unique for each region (e.g., floor) in a multi-level structure (e.g., a building). In one particular implementation, mobile device 102 may, for example, determine that it is located on a particular floor of such a building based, at least in part, on processing signals received from transmitters 110 located on various floors of the multi-level building (e.g., IEEE std 802.11 access points, Bluetooth devices, etc.). As discussed above, signals transmitted from such transmitters may, for example, include MAC addresses and/or other identifying information that is or may be determined to be uniquely associated with such transmitters. Accordingly, for example, mobile device 102 may identify which transmitter 110 is transmitting a particular received signal based upon a MAC address and/or the like decoded/determined from the received signal. Also, mobile device 102 may have knowledge indicative of specific regions (e.g., floors) to which various sets (of one or more) transmitters 110 have been assigned. Thus, in one particular example, mobile device 102 may receive a data structure that associates MAC address with building floors where particular transmitters are located. With this data structure and having knowledge of which transmitters are assigned to particular regions, mobile device 102 may, for example, determine which regions are nearby based on having received signals from the applicable transmitters 110. The techniques provided herein may be further implemented to allow mobile device 102 to determine its estimated location as being within one of these regions. Hence, a request 232 may then specify that all or part of the available assistance data 234 for that particular region be provided by, and/or otherwise made accessible from, an applicable resource.

Figure 3:
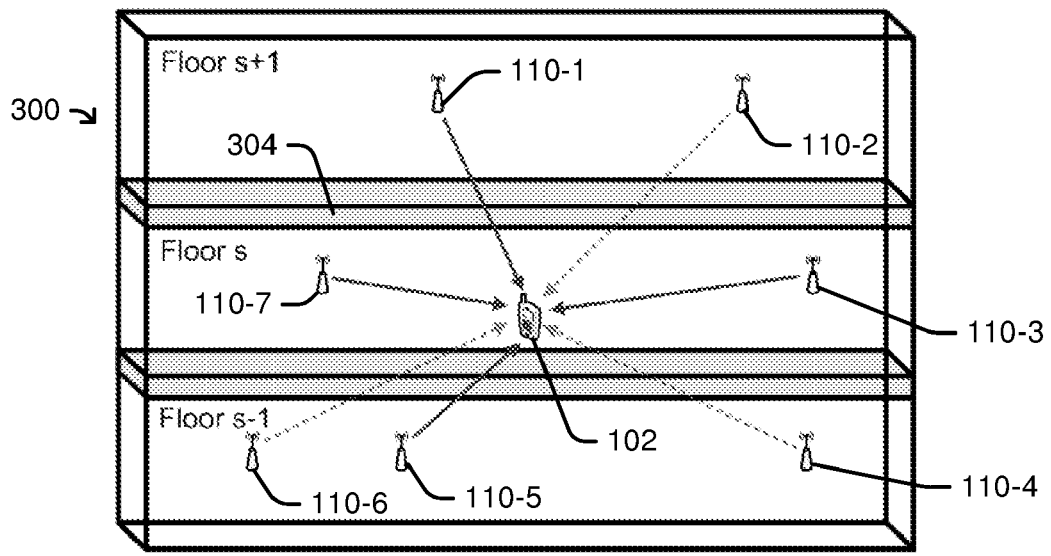
FIG. 3 is an illustrative diagram of an example structure comprising a plurality of different example regions within which a mobile device may be located, in accordance with an implementation.

FIG. 3 is an illustrative diagram of an example structure 300 in the form of a building having three distinguishable regions represented by three adjacent levels, identified as a floor "s" which is above a floor "s−1" and below a floor "s+1". In this example, mobile device 102 is illustrated as currently being located in the region represented by floor s. Also shown, are a plurality of transmitters 110-1 through 110-7, wherein, transmitters 110-1 and 110-2 are illustrated as being assigned to the region represented by floor s+1, transmitters 110-3 and 110-7 are illustrated as being assigned to the region represented by floor s, and transmitters 110-4, 110-5, and 110-6 are illustrated as being assigned to the region represented by floor s−1.

As illustrated in FIG. 3, while mobile device 102 is located on floor s it may receive signals from sets of transmitters assigned to floor s, s−1, s+1. With knowledge of the particular floors to which these various sets of transmitters are assigned and measuring the signal strengths of signals transmitted by these transmitters, mobile device 102 may attempt to estimate its location as being in at least one of the different represented regions (e.g., here, floors s, s−1, s+1). In this example, the regions are illustrated as being substantially separated into levels by physical barriers such as a supported floor 304. Accordingly, some signals may pass through the materials in supported floor 304, for example, from transmitter 110-1 to mobile device 102 and suffer some attenuation and/or other affects due to the obstructed path. Other signals may, however, propagate from one region to one or more other regions alone a path that may not pass through the materials in supported floor 304. Thus, as illustrated with a dashed-line arrow, a signal from transmitter 110-2 may take an indirect path and/or multiple paths to mobile device 102. For example, a signal from transmitter 110-2 may take a path through an opening (not shown) and/or possibly be reflected or otherwise directed by some other object/material (not shown) in or nearby support floor 304, e.g., a staircase, an elevator shaft, a utility pipe or conduit material or aperture, a window, a hatch or doorway, another structure, etc. Such and other potential RF signal transmission/propagation effects are well known and beyond the scope of this description.

In accordance with certain example implementations, to estimate its location in at least one region of structure 300, mobile device 102 may determine a probability distribution for signals received from each set of transmitters, and hence each region. Thus, for example, with regard to floor s, one or more signal parameters may be measured to determine a first probability distribution for a first set of transmitters which may comprise at least one of transmitters 110-3 and/or 110-7 from which signals may be received; with regard to floor s−1, one or more signal parameters may be measured to determine a second probability distribution for a second set of transmitters which may comprise at least one of transmitters 110-4, 110-5, and/or 110-6 from which signals may be received; and, with regard to floor s+1, one or more signal parameters may be measured to determine a third probability distribution for a third set of transmitters which may comprise at least one of transmitters 110-1 and/or 110-2 from which signals may be received. By way of example, the first, second and third probability distributions may be based, at least in part, on received signal strengths, such as, e.g., RSSI measurements, possibly adjusted RSSI measurements, and/or the like.

Figure 4:
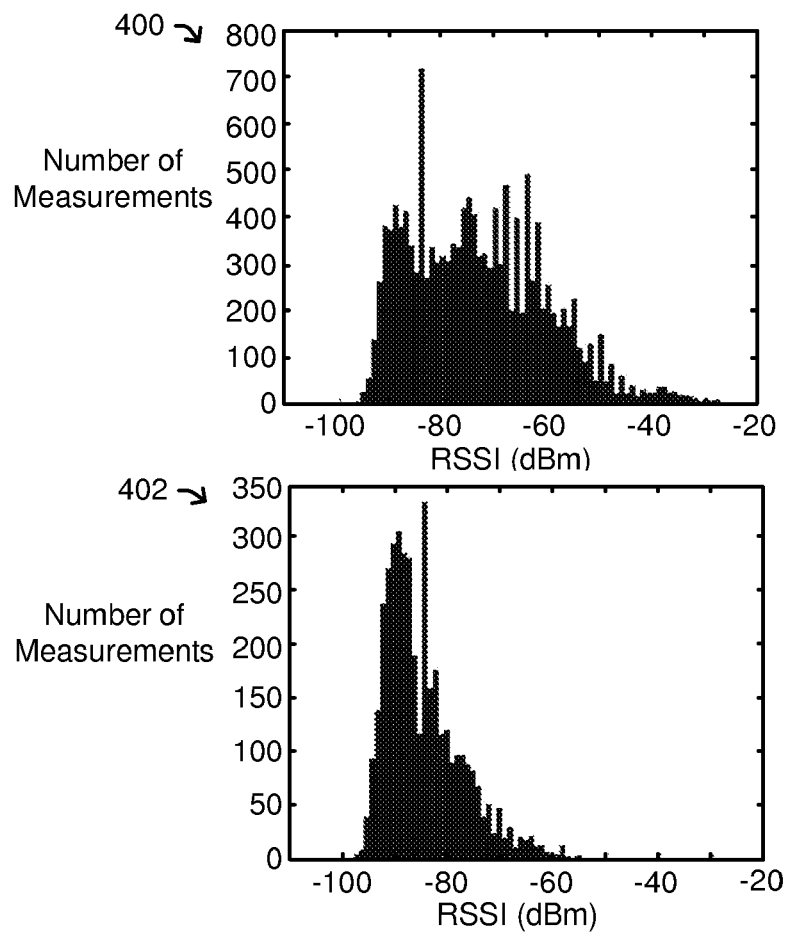
FIG. 4 shows two graphs of histograms relating to two example data sets for measured signal strengths for two sets of transmitters assigned to two different regions of an example structure, in accordance with an implementation.

FIG. 4 shows two graphs depicting a first histogram 400 and a second histogram 402 relating to two example data sets for measured signal strengths (here, RSSI measured in dBm) for signals received by a mobile device over a period of time from two sets of transmitters assigned to two different regions. In these histograms, the x-axis represents RSSI (dBm) measurement bins, and the y-axis represents the number of measurements associated with the RSSI measurement bins. First histogram 400 shows a probability distribution for signals received from a set of transmitters assigned to the same region (e.g., a floor of an office building) in which the mobile device is located. As shown in first histogram 400, the resulting example probability distribution appears to be spread fairly evenly over a wide range of measurement bins from about −55 dBm to about −92 dBm. Second histogram 402 shows a probability distribution for signals received from a set of transmitters assigned to another region, e.g., a floor in the office building that is above the floor in which the mobile device is located. As shown in second histogram 402, the resulting example probability distribution appears to be spread fairly evenly over a relatively more narrow range of measurement bins than that in first histogram 400, e.g., in measurement bins from about −75 dBm to about −96 dBm.

In accordance with certain aspects of the present description, therefore, it is believed that in many if not most structures it may be possible to distinguish between different regions based, at least in part, on all or part of such or similarly distinct probability distributions as may be determined by a mobile device located within the structure.

In accordance with still other aspects of the present description, it is further believed that in many if not most structures it may be possible to estimate a location of a mobile device within at least one region of a structure based, at least in part, on a comparison using all or part of such or similarly distinct probability distributions to a baseline probability distribution. As previously mentioned, a baseline probability distribution may be associated with one or more structures or classes of structures, one or more sets of transmitters or classes of transmitters; one or more mobile devices or classes of mobile devices, one or more specific periods of time, and/or the like or any combination thereof. Thus, a particular baseline probability distribution may be selected or otherwise obtained by a mobile device depending in the situation and/or other design considerations.

Figure 5:
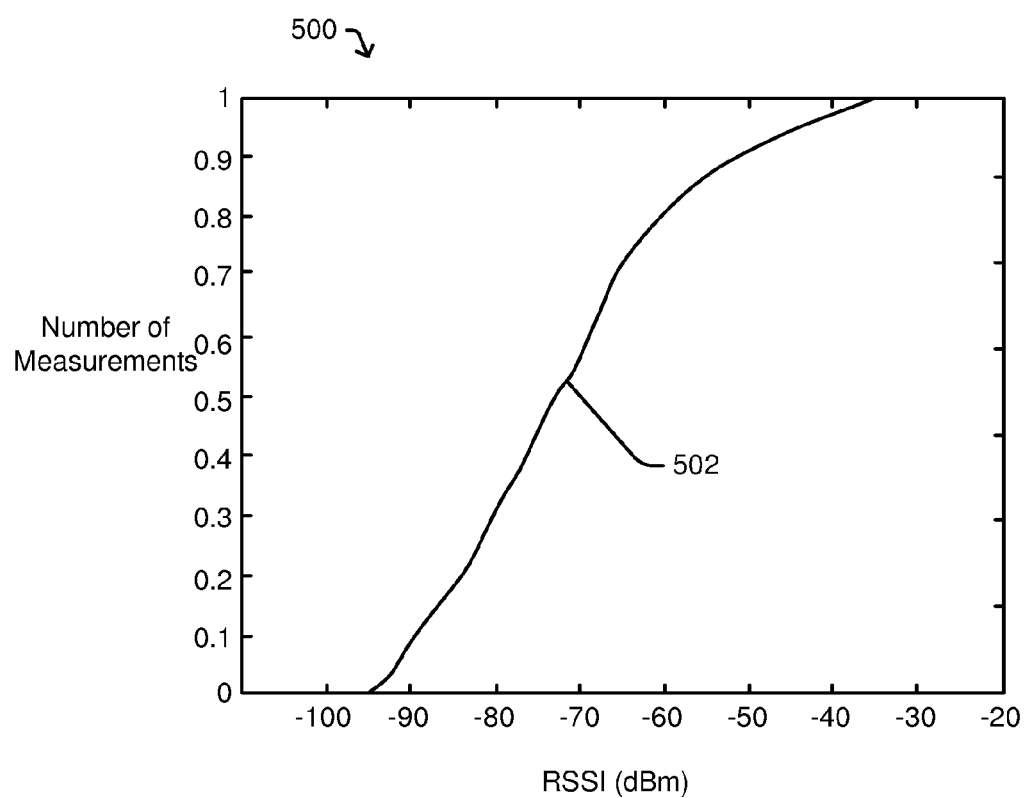
FIG. 5 is a line graph illustrating an example baseline probability distribution in the form of a CDF that may be based, at least in part, on an example data set and/or example function, in accordance with an implementation.

In certain example implementations, it may be simpler, quicker, and/or otherwise more feasible to simply use one baseline probability distribution, e.g., for many or possibly all situations. For example, one may refer to such a baseline probability distribution as a "generic" or "default" baseline probability distribution. An example of such a "generic" or "default" baseline probability distribution is listed in Table 1 below as a set of data in the form of a cumulative probability distribution, which is also plotted in line graph 500 as illustrated in FIG. 5. It should be recognized that in certain other example implementations such a "generic" or "default" baseline probability distribution as listed in Table 1 may also be reduced or expanded in size (e.g., to provided fewer or greater numbers of measurement bins and/or data points). Further still, it should be recognized that in certain other example implementations such a "generic" or "default" baseline probability distribution as listed in Table 1 may also be represented by one or more mathematical functions, e.g., as previously mentioned: a PDF, a CDF, a histogram, a continuous probability distribution, a discrete probability distribution, other mathematical function(s), and/or the like or any combination thereof.

In example line graph 500, the x-axis corresponds to RSSI (dBm) measurement bins ranging from −20 to −110 dBm, and the y-axis corresponds to the cumulative number of measurements over a period of time ranging from 0.000 to 1.000. In this example, a baseline curve 502 illustrates an example cumulative probability distribution for the example data set in Table 1, and which may be used as a baseline probability distribution.

TABLE 1

Example Data Set for a (Cumulative) Baseline Probability Distribution:

| RSSI (dBm) | Number of Measurements |
|---|---|
| −96 | 0.000 |
| −95 | 0.003 |
| −94 | 0.014 |
| −93 | 0.025 |
| −92 | 0.048 |
| −91 | 0.070 |
| −90 | 0.089 |
| −89 | 0.113 |
| −88 | 0.137 |
| −87 | 0.151 |
| −86 | 0.174 |
| −85 | 0.183 |
| −84 | 0.201 |
| −83 | 0.222 |
| −82 | 0.256 |
| −81 | 0.285 |
| −80 | 0.311 |
| −79 | 0.337 |
| −78 | 0.357 |
| −77 | 0.380 |
| −76 | 0.413 |
| −75 | 0.445 |
| −74 | 0.471 |
| −73 | 0.494 |
| −72 | 0.523 |
| −71 | 0.538 |
| −70 | 0.575 |
| −69 | 0.593 |
| −68 | 0.639 |
| −67 | 0.656 |
| −66 | 0.692 |
| −65 | 0.706 |
| −64 | 0.747 |
| −63 | 0.762 |
| −62 | 0.784 |
| −61 | 0.793 |
| −60 | 0.809 |
| −59 | 0.816 |
| −58 | 0.831 |
| −57 | 0.849 |
| −56 | 0.854 |
| −55 | 0.869 |
| −54 | 0.874 |
| −53 | 0.883 |
| −52 | 0.890 |
| −51 | 0.895 |
| −50 | 0.906 |
| −49 | 0.908 |
| −48 | 0.925 |
| −47 | 0.929 |
| −46 | 0.937 |
| −45 | 0.940 |
| −44 | 0.951 |

TABLE 1-continued

Example Data Set for a (Cumulative) Baseline Probability Distribution:

| RSSI (dBm) | Number of Measurements |
|---|---|
| −43 | 0.956 |
| −42 | 0.964 |
| −41 | 0.969 |
| −40 | 0.970 |
| −39 | 0.977 |
| −38 | 0.985 |
| −37 | 0.989 |
| −36 | 0.991 |
| −35 | 0.993 |
| −34 | 0.997 |
| −33 | 0.998 |
| −32 | 0.998 |
| −31 | 0.998 |
| −30 | 0.998 |
| −29 | 0.999 |
| −28 | 0.999 |
| −27 | 0.999 |
| −26 | 0.999 |
| −25 | 0.999 |
| −24 | 1.000 |

Figure 6:
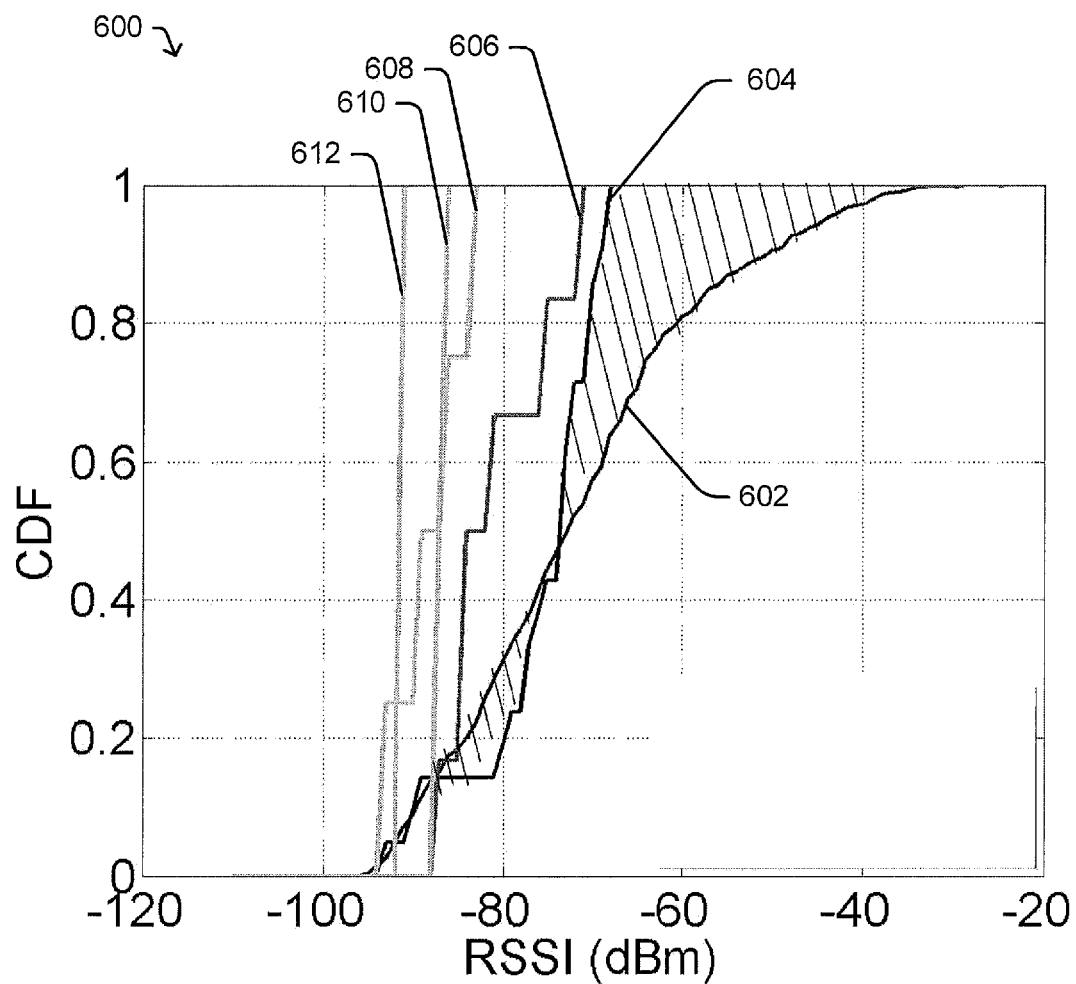
FIG. 6 is a line graph illustrating several example CDFs for an example baseline probability distribution and five different probability distributions relating to five data sets for measured signal strengths from five sets of transmitters associated with five different regions of an example structure, in accordance with an implementation.

Attention is drawn next to FIG. 6, which is a line graph 600 similar to that shown in FIG. 5. In graph 600, a baseline curve 602 represents an example baseline probability distribution in the form of a plotted CDF. Curve 602 may, for example, represent a "generic" or "default" baseline probability distribution, or a particular baseline probability distribution, e.g., selected for use in a given situation. Determined curves 604, 606, 608, 610 and 612 represent five different determined probability distributions relating to five data sets for measured signal strengths from five sets of transmitters associated with five different regions of an example structure. A variation between at least a portion of the data set plotted in baseline curve 602 and at least a portion of the data sets plotted in the determined curves 604, 606, 608, 610 and 612 may be determined. By way of example, through a visual representation, a variation between baseline curve 602 and determined curve 604 may be seen as all or part of the area (e.g., illustrated as hatch marked with diagonal-lines) on graph 600 between baseline curve 602 and determined curve 604. In this example, it should be recognized that the variation between baseline curve 602 and determined curve 604 is less than similarly determined variations would be between baseline curve 602 and each of the four remaining determined curves 606, 608, 610, and 612. Thus, in this example and in accordance with certain aspects of the present description, a mobile device may estimate that it is currently located in a region of a structure to which the set of transmitters associated with determined curve 604 are assigned.

Figure 7:
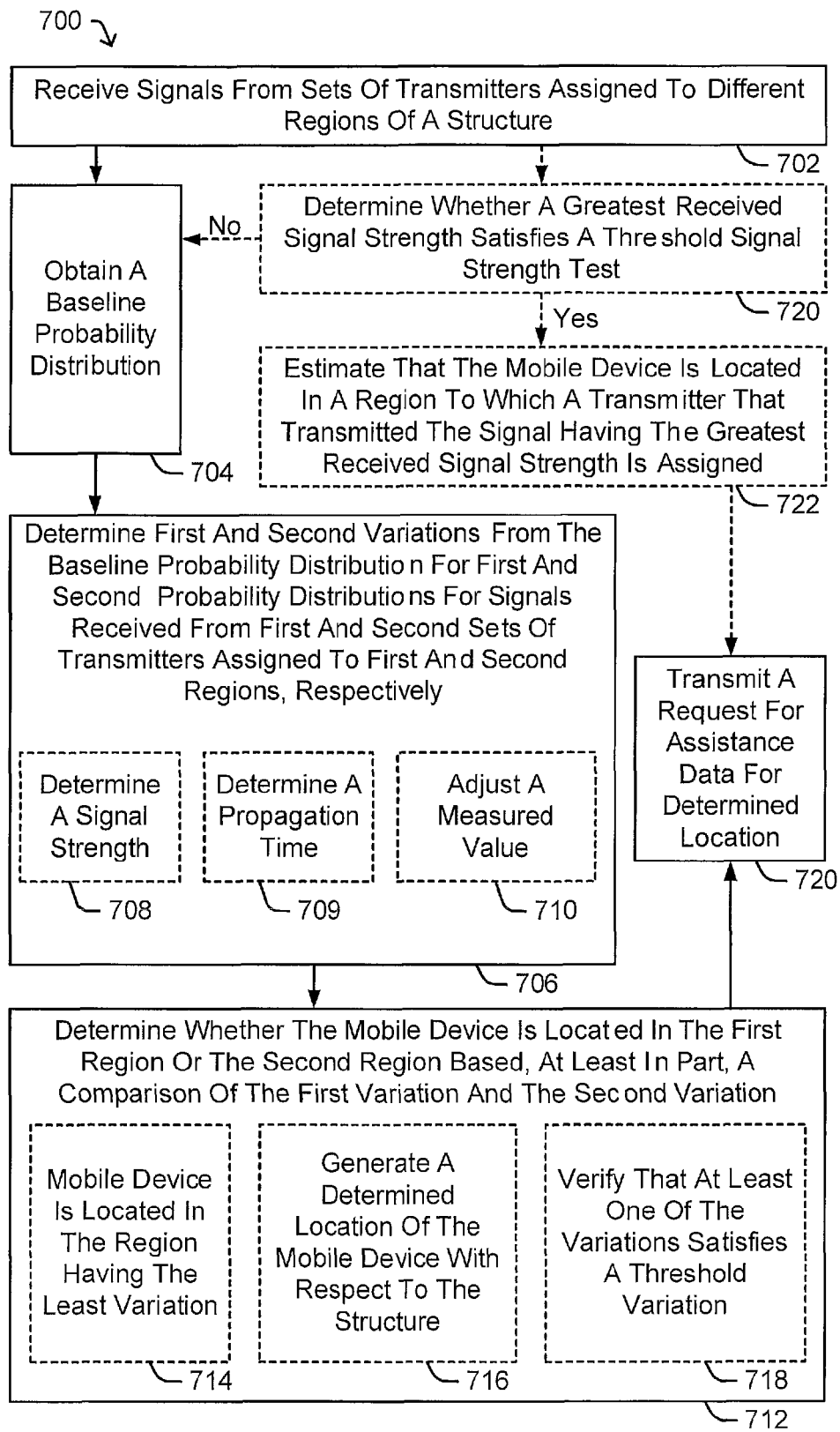
FIG. 7 is a flow diagram illustrating certain features of an example process or method for use in estimating a location of a mobile device within at least one of a plurality of different regions of a structure, in accordance with an implementation.

FIG. 7 is a flow diagram illustrating certain features of an example process or method 700 for use in estimating a location of a mobile device within at least one of a plurality of different regions of a structure, in accordance with an implementation.

At example block 702, a mobile device may receive signals from one or more sets of one or more transmitters assigned to one or more different regions of a structure. The signals may, for example, be received over one or more different periods of time. At block 702, a mobile device may, for example, measure one or more signal characteristics, e.g., as measured signal parameters. For example, in certain implementations a mobile device may measure signal strengths for signals received. In certain example implementations, a mobile device may selectively adjust certain measured signal parameters. For example, signal strength measurements for signals received from certain transmitters may be adjusted in some manner to normalize the values and/or convert the values for use with other signal strength values from one or more other transmitters. Thus, for example, if a certain type or class of transmitter is known to transmit signals at boosted or reduced levels and/or more or less often when compared to others (e.g., possibly at all times or at selected times), it may be useful to normalize or otherwise adjust the resulting values in some manner so that these values do not skew or otherwise erroneously affect the example techniques as provided herein. In certain example implementations, some received signals may be removed or ignored for similar reasons, e.g., as may be determined based on one or more minimum or maximum, or other like thresh-holding techniques.

At example block 704, a mobile device may obtain a baseline probability distribution. For example, in certain instances a generic or default baseline probability distribution may be used. In certain example implementations, a particular baseline probability distribution may be used. In certain example implementations, a mobile device may obtain a baseline probability distribution from another resource, e.g., over a wired or wireless communication link. In certain example implementations, a baseline probability distribution may be represented by a data set, a mathematical function, and/or the like.

At example block 706, a mobile device may determine a first variation between a baseline probability distribution and a first probability distribution for signals received from a first set of transmitters assigned to a first region of a structure. Also at block 706, a mobile device may determine a second variation between the baseline probability distribution and a second probability distribution for signals received from a second set of transmitters assigned to a second region of the structure. By way of example, in certain instances at block 708, a mobile device may determine a signal strength, e.g., based, at least in part, on a measured RSSI, etc. By way of example, in certain instances at block 709, a mobile device may determine a propagation time, e.g., based, at least in part, on a measured TOF, RTT, etc. Further, for example, at block 710 a mobile device may adjust a measured RSSI.

At example block 712, a mobile device may determine whether its estimated location is in the first region or the second region based, at least in part, on a comparison of the first variation and the second variation. Thus, for example at block 714, a mobile device may estimate that it is located in the first region if the first variation is less than the second variation, or that it is located in the second region if the second variation is less than the first variation. A mobile device may, for example at block 716, generate one or more electrical signals representing a determined (estimated) location of the mobile device with respect to the structure. In certain instances, for example at block 718, a mobile device may verify that at least one of the first variation or the second variation satisfies a threshold variation. Thus, for example, if the variations are greater than an acceptable maximum threshold variation, the current probability distributions may be unreliable or unusable and instead it may be beneficial to perform all or part of method 700 over again, e.g., to collect more signal measurements, collect new signal measurements, etc. Conversely, for example, if two or more variations are within an minimum threshold variation of one another, it may be difficult to estimate which region the mobile device is in and instead it may be beneficial to perform all or part of method 700 over again, e.g., to collect more signal measurements, collect new signal measurements, etc. Of course in certain instances, a mobile device may estimate that it is located in more than one region, for example, if two or more regions appear to or actually do overlap in some operative or physical manner, if movement or trajectory of the mobile device would appear to reflect that its location is currently or may soon transition from one region to another region, and/or if two or more regions are relatively small and adjacent or possibly related in some operative manner, etc., to name just a few examples.

At example block 720, a mobile device may transmit one or more requests for assistance data, e.g., relating to one or more regions at the estimated location of the mobile device.

In accordance with certain further implementations, method 700 may be modified as illustrated at example blocks 720 and 722, for example. As modified, rather than proceed from example block 702 to example block 704, method 700 may proceed from example block 702 to example block 720.

At example block 720 it may be determined whether a greatest received signal strength from the signals received satisfies a threshold signal strength test. In one particular example implementation, a greatest received signal strength may be determined to satisfy an example threshold signal strength test if its signal strength exceeds the signal strength of the signals received from other sets of transmitters (e.g., assigned to different regions) by more than a threshold value (e.g., 5.0 dB).

If the received signal having the greatest measured signal strength does not satisfy the threshold signal strength test, then method 700 may proceed to example block 704.

If the received signal having the greatest measured signal strength does satisfy the threshold signal strength test, then method 700 may proceed to example block 722. At example block 722, the mobile device may estimate that it is located in a region to which the transmitter that transmitted the signal having the greatest received signal strength is assigned. Method 700 may then, for example, proceed to example block 720, having skipped over example blocks 704, 706, and 712.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

The methodologies described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining", "establishing", "obtaining", "identifying", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method comprising, at a mobile device:
   determining a first variation between one or more electrical signals representing a baseline probability distribution and one or more electrical signals representing a first probability distribution for signals received from a first set of transmitters assigned to a first region of a structure;
   determining a second variation between the one or more electrical signals representing the baseline probability distribution and one or more electrical signals representing a second probability distribution for signals received from a second set of transmitters assigned to a second region of the structure;
   determining whether the mobile device is located in the first region or the second region based, at least in part, on a comparison of the first variation and the second variation;
   verifying that at least one of the first variation or the second variation satisfies a threshold variation; and
   generating one or more electrical signals indicating a determined location of the mobile device with respect to the structure.

2. The method as recited in claim 1, wherein determining whether the mobile device is located in the first region or the second region further comprises:
   determining that the mobile device is located in the first region if the first variation is less than the second variation, and
   determining that the mobile device is located in the second region if the second variation is less than the first variation.

3. The method as recited in claim 1, wherein at least a part of at least one of the baseline probability distribution, the first probability distribution, or the second probability distribution mathematically corresponds to at least one of: a probability distribution function (PDF); a cumulative distribution function (CDF); a histogram; a continuous probability distribution; or a discrete probability distribution.

4. The method as recited in claim 1, wherein the first probability distribution is based, at least in part, on signal strengths for the signals received from the first set of transmitters.

5. The method as recited in claim 4, and further comprising, at the mobile device:
   determining at least one of the signal strengths based, at least in part, on a measured RSSI.

6. The method as recited in claim 4, and further comprising, at the mobile device:
   determining at least one of the signal strengths by adjusting a measured RSSI.

7. The method as recited in claim 1, wherein the baseline probability distribution is associated with at least one of: the structure; a specific class of structures; at least the first set of transmitters and the second set of transmitters; a specific class of transmitters; the mobile device; a specific class of mobile devices; or a specific period of time.

8. The method as recited in claim 1, wherein the structure comprises a plurality of levels, the first region comprises at least a portion of one level of the structure, and the second region comprises at least a portion of another level of the structure.

9. The method as recited in claim 1, and further comprising, at the mobile device:
in response to determining that the mobile device is located in the first region, transmitting one or more signals representing a request for assistance data associated with the first region of the structure.

10. An apparatus for use in a mobile device, the apparatus comprising:
means for determining:
a first variation between a baseline probability distribution and a first probability distribution for signals received from a first set of transmitters assigned to a first region of a structure; and
a second variation between the baseline probability distribution and a second probability distribution for signals received from a second set of transmitters assigned to a second region of the structure;
means for verifying that at least one of the first variation or the second variation satisfies a threshold variation; and
means for determining whether the mobile device is located in the first region or the second region based, at least in part, on the first variation and the second variation.

11. The apparatus as recited in claim 10, the means for determining whether the mobile device is located in the first region or the second region to determine that the mobile device is located in the first region if the first variation is less than the second variation, and that the mobile device is located in the second region if the second variation is less than the first variation.

12. The apparatus as recited in claim 10, wherein at least a part of at least one of the baseline probability distribution, the first probability distribution, or the second probability distribution mathematically corresponds to at least one of: a probability distribution function (PDF); a cumulative distribution function (CDF); a histogram; a continuous probability distribution; or a discrete probability distribution.

13. The apparatus as recited in claim 10, wherein the first probability distribution is based, at least in part, on signal strengths for the signals received from the first set of transmitters.

14. The apparatus as recited in claim 13, and further comprising:
means for determining at least one of the signal strengths based, at least in part, on a measured RSSI.

15. The apparatus as recited in claim 13, and further comprising:
means for determining at least one of the signal strengths by adjusting a measured RSSI.

16. The apparatus as recited in claim 10, wherein the baseline probability distribution is associated with at least one of: the structure; a specific class of structures; at least the first set of transmitters and the second set of transmitters; a specific class of transmitters; the mobile device; a specific class of mobile devices; or a specific period of time.

17. The apparatus as recited in claim 10, wherein the structure comprises a plurality of levels, the first region comprises at least a portion of one level of the structure, and the second region comprises at least a portion of another level of the structure.

18. The apparatus as recited in claim 10, and further comprising:
means for transmitting a request for assistance data associated with the first region of the structure, in response to a determination that the mobile device is located in the first region.

19. A mobile device comprising:
a network interface; and
a processing unit to:
determine a first variation between a baseline probability distribution and a first probability distribution for signals received via the network interface from a first set of transmitters assigned to a first region of a structure;
determine a second variation between the baseline probability distribution and a second probability distribution for signals received via the network interface from a second set of transmitters assigned to a second region of the structure;
verify that at least one of the first variation or the second variation satisfies a threshold variation; and
determine whether the mobile device is located in the first region or the second region based, at least in part, on a comparison of the first variation and the second variation.

20. The apparatus as recited in claim 19, the processing unit to further: determine that the mobile device is located in the first region if the first variation is less than the second variation, and determine that the mobile device is located in the second region if the second variation is less than the first variation.

21. The apparatus as recited in claim 19, wherein at least a part of at least one of the baseline probability distribution, the first probability distribution, or the second probability distribution mathematically corresponds to at least one of: a probability distribution function (PDF); a cumulative distribution function (CDF); a histogram; a continuous probability distribution; or a discrete probability distribution.

22. The apparatus as recited in claim 19, wherein the first probability distribution is based, at least in part, on signal strengths for the signals received via the network interface from the first set of transmitters.

23. The apparatus as recited in claim 22, the processing unit to further:
determine at least one of the signal strengths based, at least in part, on a measured RSSI.

24. The apparatus as recited in claim 22, the processing unit to further:
determine at least one of the signal strengths by adjusting a measured RSSI.

25. The apparatus as recited in claim 19, wherein the baseline probability distribution is associated with at least one of: the structure; a specific class of structures; at least the first set of transmitters and the second set of transmitters; a specific class of transmitters; the mobile device; a specific class of mobile devices; or a specific period of time.

26. The apparatus as recited in claim 19, wherein the structure comprises a plurality of levels, the first region comprises at least a portion of one level of the structure, and the second region comprises at least a portion of another level of the structure.

27. The apparatus as recited in claim 19, the processing unit to further:
initiate transmission via the network interface of a request for assistance data associated with the first region of the structure, in response to a determination that the mobile device is located in the first region.

28. An article comprising:
a non-transitory computer readable medium having stored therein instructions executable by a processing unit in a mobile device to:

determine a first variation between a baseline probability distribution and a first probability distribution for signals received from a first set of transmitters assigned to a first region of a structure;

determine a second variation between the baseline probability distribution and a second probability distribution for signals received from a second set of transmitters assigned to a second region of the structure;

verify that at least one of the first variation or the second variation satisfies a threshold variation; and determine whether the mobile device is located in the first region or the second region based, at least in part, on a comparison of the first variation and the second variation.

29. The article as recited in claim 28, wherein the instructions are further executable by the processing unit to:

determine that the mobile device is located in the first region if the first variation is less than the second variation, and determine that the mobile device is located in the second region if the second variation is less than the first variation.

30. The article as recited in claim 28, wherein at least a part of at least one of the baseline probability distribution, the first probability distribution, or the second probability distribution mathematically corresponds to at least one of: a probability distribution function (PDF); a cumulative distribution function (CDF); a histogram; a continuous probability distribution; or a discrete probability distribution.

31. The article as recited in claim 28, wherein the first probability distribution is based, at least in part, on signal strengths for the signals received via the network interface from the first set of transmitters.

32. The article as recited in claim 31, and the instructions are further executable by the processing unit to:

determine at least one of the signal strengths based, at least in part, on a measured RSSI.

33. The article as recited in claim 31, and the instructions are further executable by the processing unit to:

determine at least one of the signal strengths by adjusting a measured RSSI.

34. The article as recited in claim 28, wherein the baseline probability distribution is associated with at least one of: the structure; a specific class of structures; at least the first set of transmitters and the second set of transmitters; a specific class of transmitters; the mobile device; a specific class of mobile devices; or a specific period of time.

35. The article as recited in claim 28, wherein the structure comprises a plurality of levels, the first region comprises at least a portion of one level of the structure, and the second region comprises at least a portion of another level of the structure.

36. The article as recited in claim 28, and the instructions are further executable by the processing unit to:

initiate transmission of a request for assistance data associated with the first region of the structure, in response to a determination that the mobile device is located in the first region.

* * * * *